United States Patent
Matsunaga (10) Patent No.: US 7,810,320 B2
(45) Date of Patent: Oct. 12, 2010

(54) ATMOSPHERIC TEMPERATURE DETECTING APPARATUS AND EXHAUST EMISSION PURIFICATION APPARATUS

(75) Inventor: Hideki Matsunaga, Ageo (JP)

(73) Assignee: Nissan Diesel Motor Co., Ltd., Ageo-shi, Saitama (JP)

( * ) Notice: Subject to any disclaimer, the term of this patent is extended or adjusted under 35 U.S.C. 154(b) by 169 days.

(21) Appl. No.: 12/173,791

(22) Filed: Jul. 15, 2008

(65) Prior Publication Data

US 2008/0271437 A1 Nov. 6, 2008

Related U.S. Application Data

(63) Continuation of application No. PCT/JP2006/322352, filed on Nov. 9, 2006.

(51) Int. Cl.
*F01N 3/10* (2006.01)

(52) U.S. Cl. .............. 60/300; 60/301; 60/285; 60/273; 73/114.31; 73/114.34

(58) Field of Classification Search ........... 60/284–287, 60/290, 295, 299–301; 73/114.31–114.34
See application file for complete search history.

(56) References Cited

U.S. PATENT DOCUMENTS 5,201,217 A * 4/1993 Wachi ................ 73/114.34
6,519,935 B2 * 2/2003 Weigl ................... 60/286

FOREIGN PATENT DOCUMENTS

| JP | 10-306740 | | 11/1998 |
|---|---|---|---|
| JP | 10306740 A | * | 11/1998 |
| JP | 2000-027627 | | 1/2000 |
| JP | 2000027627 | * | 1/2000 |
| JP | 2003-328867 | | 11/2003 |
| JP | 2004-346913 | | 12/2004 |
| JP | 2005-207321 | | 8/2005 |

OTHER PUBLICATIONS

U.S. Appl. No. 12/177,852, filed Jul. 22, 2008, Exhaust Emission Purifying Apparatus For Engine.

(Continued)

*Primary Examiner*—Thomas E Denion
*Assistant Examiner*—Jesse Bogue
(74) *Attorney, Agent, or Firm*—McDermott Will & Emery LLP (57) ABSTRACT

An intake air temperature detected by an airflow sensor is corrected based on a rotation speed of an engine and a fuel supply amount to thereby estimate an atmospheric temperature. The atmospheric temperature is estimated by calculating a dynamic temperature error caused by heat generated around an engine and a correction factor in regard to thermal influence which changes according to the flow rate of an intake air, and correcting the intake air temperature detected by the airflow sensor with the temperature error corrected with the correction factor. On the basis of the atmospheric temperature, an electric heater is controlled, which is provided on at least a part of a system of supplying a reducing agent or its precursor, for example, a supply pipe mutually communicating a reducing agent container with a reducing agent supplying apparatus.

9 Claims, 5 Drawing Sheets

OTHER PUBLICATIONS

U.S. Appl. No. 10/574,346, filed Nov. 28, 2006, Engine Exhaust Emission Control Device And Exhaust Emission Control Method.
U.S. Appl. No. 10/577,222, filed Nov. 28, 2006, Exhaust Gas Purifying Apparatus And Exhaust Gas Purifying Method Of An Engine.
U.S. Appl. No. 11/790,739, filed Apr. 27, 2007, Exhaust Emission Purifying Apparatus For Engine.
U.S. Appl. No. 11/800,450, filed May 4, 2007, Exhaust Gas Purification Apparatus.
U.S. Appl. No. 11/812,871, filed Jun. 22, 2007, Exhaust Emission Purifying Apparatus For Engine.
U.S. Appl. No. 11/952,397, filed Dec. 7, 2007, Exhaust Gas Purifying Apparatus For Engine.
U.S. Appl. No. 12/173,783, filed Jul. 15, 2008, Exhaust Emission Purifying Apparatus For Engine.

* cited by examiner

FIG. 5

ATMOSPHERIC TEMPERATURE DETECTING APPARATUS AND EXHAUST EMISSION PURIFICATION APPARATUS

This application is a continuation of PCT/JP2006/322352, filed on Nov. 9, 2006.

BACKGROUND OF THE INVENTION

1. Field of Invention

The present invention relates to a technique of detecting atmospheric temperature at high accuracy by using a hot wire airflow sensor. The present invention also relates to a technique of controlling an electric heater provided in a system of supplying a reducing agent or its precursor at high accuracy in response to atmospheric temperature in an exhaust emission purification apparatus which is provided for reducing nitrogen oxide (NOx) in exhaust emission from an engine by using the reducing agent.

2. Description of the Related Art

As a catalytic purification system for reducing NOx in engine exhaust emission, an exhaust emission purification apparatus described in Japanese Laid-Open (Kokai) Patent Application Publication No. 2000-27627 has been proposed. In such an exhaust emission purification apparatus, a reducing agent or its precursor according to an engine operating state is injected and supplied to exhaust emission at a position on upstream side of a reduction catalytic converter disposed in an engine exhaust emission system to cause a catalyst reduction reaction between NOx in the exhaust emission and the reducing agent, thereby purifying NOx to harmless components. Such an exhaust emission purification apparatus employs a technique of controlling an electric heater provided in a supply system of a reducing agent or its precursor on the basis of the atmospheric temperature detected by a temperature sensor so as to prevent the reducing agent or its precursor from being frozen and to promote defrosting the reducing agent or its precursor.

On the other hand, also in engine control, as described in Japanese Laid-Open (Kokai) Patent Application Publication No. 2005-207321, there is a technique of using atmospheric temperature as a control variable.

Although the atmospheric temperature is generally detected by a temperature sensor, in a different system having a hot wire airflow sensor, it is possible to detect intake air temperature due to the operating principle of detection of the sensor. Therefore, in order to satisfy various demands such as cost reduction, using the intake air temperature is employed as a practical technique in replacement of using the atmospheric temperature.

With the hot wire airflow sensor, it must be taken into consideration that since the hot wire airflow sensor is disposed near the engine, the sensor is actually susceptible to heat from the engine. In the hot wire airflow sensor, temperature compensation is performed by means of known a bridge circuit. Therefore, there is no substantial influence on intake air flow rate to be inherently detected. However, there is such an inconvenience that a temperature signal output by the hot wire airflow sensor is apt to be influenced by heat from the engine, and a difference appears between the temperature signal and an actual atmospheric temperature.

When the electric heater of the exhaust emission purification apparatus is controlled in response to such an atmospheric temperature, there is a possibility that various inconveniences occur such that the electric heater is operated although the reducing agent or its precursor is not frozen, or the electric heater is not operated although the reducing agent or its precursor is frozen. In engine control, there is such a possibility that an unexpected control is performed. It is also difficult to perform the engine control based on a temperature output signal coming from the hot wire airflow sensor.

SUMMARY OF THE INVENTION

Therefore, in view of the above-described problems encountered by the conventional techniques, the present invention has an object to provide an atmospheric temperature detecting apparatus capable of realizing an improvement of accuracy in the detection of the atmospheric temperature by compensating a temperature signal output by a hot wire airflow sensor in accordance with the engine operating state.

Another object of the present invention is to provide an exhaust emission purification apparatus realizing prevention of freezing of a reducing agent or its precursor as well as promotion of defrosting a reducing agent or its precursor with the minimum power by controlling an electric heater provided in a system for supplying the reducing agent or its precursor in response to atmospheric temperature detected by an atmospheric temperature detecting apparatus.

An atmospheric temperature detecting apparatus according to the present invention corrects an intake air temperature detected by a hot wire airflow sensor capable of detecting a flow rate of an intake air and an intake air temperature in accordance with an engine operating state thereby estimating an atmospheric temperature. Further, an exhaust emission purification apparatus according to the present invention corrects an intake air temperature detected by a hot wire airflow sensor capable of detecting a flow rate of an intake air and an intake air temperature in accordance with an engine operating state thereby estimating an atmospheric temperature, and at the same time, in accordance with the estimated atmospheric temperature, controls an electric heater provided in at least a part of a system for supplying a reducing agent or its precursor.

The atmospheric temperature is estimated in such a manner that a dynamic temperature error of heat, which generates around the engine is corrected by a correction factor based in regard to the thermal influence which changes according to the flow rate of the intake air, and at the same time, the intake air temperature detected by the airflow sensor is corrected with the corrected temperature error. Further, the dynamic temperature error is calculated by correcting a steady temperature error with a smoothed time constant of the temperature change.

In the atmospheric temperature detecting apparatus according to the present invention, an intake air temperature detected by the airflow sensor is corrected in accordance with the engine operating state, so that the atmospheric temperature can be estimated. Specifically, since the airflow sensor is disposed near the engine, there is a possibility that the airflow sensor is thermally influenced by combustion heat of an air-fuel mixture, so that the intake air temperature detected by the airflow sensor becomes different from an actual temperature. However, due to correction of the intake air temperature in accordance with the engine operating state, it is able to cancel out the influence of the combustion heat, and the accuracy of detecting the atmospheric temperature by the airflow sensor can be greatly improved.

With the exhaust emission purification apparatus according to the present invention, it is possible to avoid such various inconveniences in electric heater control that either the electric heater is operated even when a reducing agent or its precursor is not frozen or the electric heater is not brought into operation in spite of the fact that the reducing agent or its precursor is frozen. Consequently, prevention of freezing the reducing agent or its precursor and promotion of defrosting of the reducing agent or its precursor can be properly achieved.

DESCRIPTION OF THE PREFERRED EMBODIMENTS

Hereunder is a detailed description of the present invention with reference to the accompanying drawings.

Figure 1:
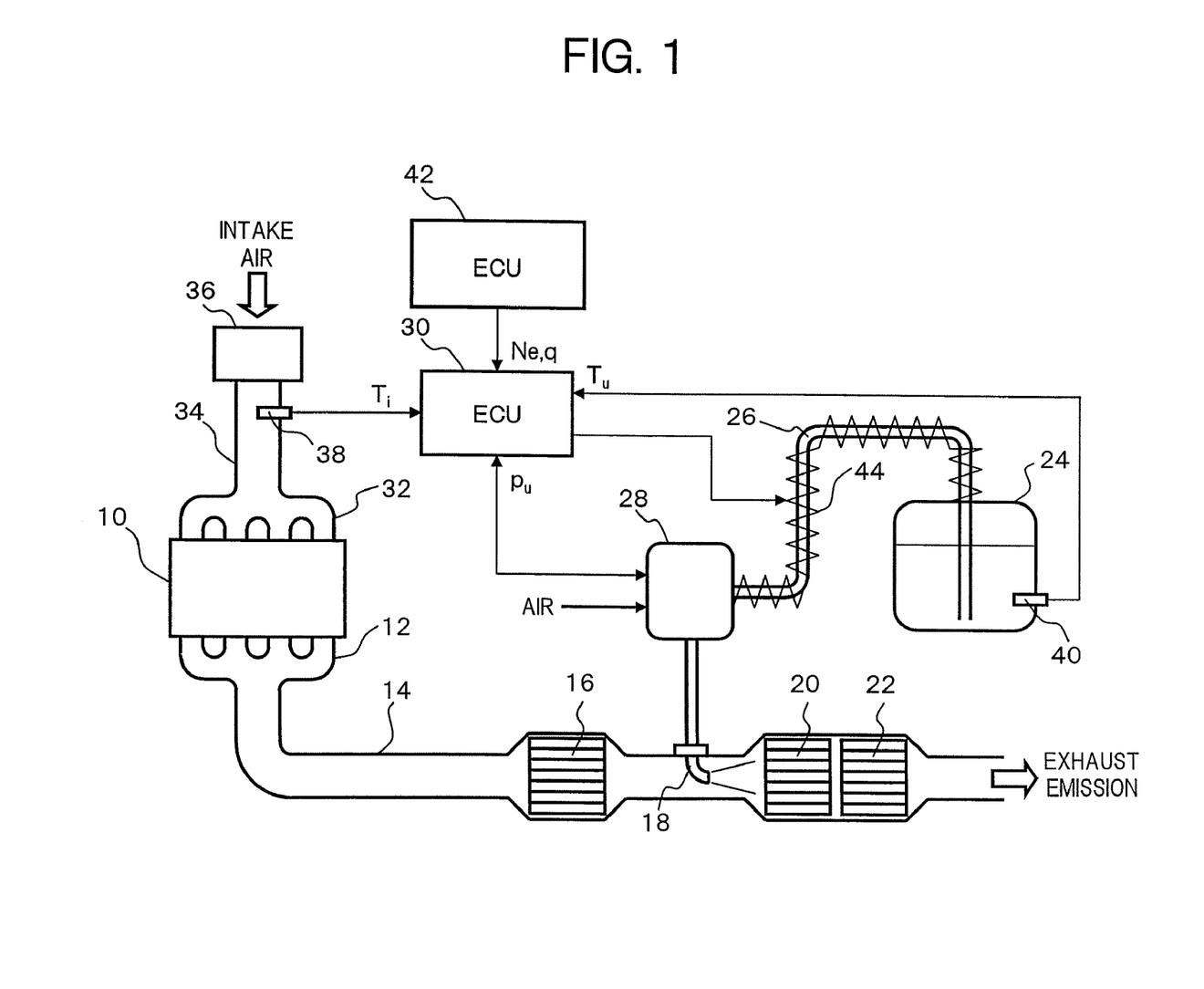
FIG. 1 is a configuration diagram illustrating exhaust emission purification apparatus according to an embodiment of the present invention.

FIG. 1 shows a general configuration of an exhaust emission purification apparatus provided with an atmospheric temperature detecting apparatus according to the present invention.

In an exhaust pipe 14 connected to an exhaust manifold 12 of an engine 10, a nitrogen oxidation catalytic converter 16 for oxidizing nitric oxide (NO) to nitrogen dioxide ($NO_2$), an injection nozzle 18 for injecting and supplying urea aqueous solution as a reducing agent precursor, an NOx reduction catalytic converter 20 for reducing NOx by using ammonia obtained from the urea aqueous solution as a reducing agent, and an ammonia oxidation catalytic converter 22 for oxidizing ammonia passed through the NOx reduction catalytic converter 20 are disposed along flow direction of the exhaust emission. The urea aqueous solution stored in a reducing agent container 24 is supplied to a reducing agent supplying apparatus 28 via a supply pipe 26. Suction port of the supply pipe 26 is open at the bottom of the reducing agent container 24. The reducing agent supplying apparatus 28 is controlled by a control unit 30 having incorporated therein a computer. The urea aqueous solution according to the engine operating state is mixed with air and the mixture is supplied in an atomized state to the injection nozzle 18. The reducing agent supplying apparatus 28 has incorporated therein a pressure sensor capable of detecting pressure "pu" of the urea aqueous solution supplied to the injection nozzle 18, and an output issuing from the pressure sensor is input to the control unit 30.

In the exhaust emission purification apparatus, the urea aqueous solution injected and supplied from the injection nozzle 18 is hydrolyzed by exhaust heat and vapor in the exhaust emission, thereby generating ammonia functioning as the reducing agent. It is known that the generated ammonia reacts chemically with NOx in the exhaust emission in the NOx reduction catalytic converter 20 and is purified to water ($H_2O$) and harmless nitrogen gas ($N_2$). In order to improve NOx reduction efficiency of the NOx reduction catalytic converter 20, NO is oxidized to $NO_2$ by the nitrogen oxidation catalytic converter 16, and the ratio between NO and $NO_2$ in the exhaust emission is improved so as to be adapted to the catalyst reduction reaction. The ammonia having passed through the NOx reduction catalytic converter 20 is oxidized by the ammonia oxidation catalytic converter 22 disposed on the exhaust downstream side thereof, so that ammonia as is can be prevented from being exhausted directly to the atmosphere.

On the other hand, an air cleaner 36 for filtering foreign matters such as dust from the atmosphere and a hot wire airflow sensor (hereinbelow, called "airflow sensor") 38 for detecting the intake air flow rate are disposed along the intake air distribution direction in an intake pipe 34 connected to an intake manifold 32 of the engine 10. The airflow sensor 38 indirectly detects the flow rate of the intake air by using the convection heat transfer phenomenon in which the amount of heat taken from a heating element changes in accordance with the flow rate of the intake air. An intake air temperature Ti can be simultaneously detected by the airflow sensor 38 on the basis of the detection principle of the flow rate of the intake air.

As a control system of the exhaust emission purification apparatus, a temperature sensor 40 for detecting solution temperature "Tu" of the urea aqueous solution is attached to the reducing agent container 24 and an output of the temperature sensor 40 is input to the control unit 30. The control unit 30 is connected to an engine control unit 42 to be able to communicate with each other via a network such as a CAN (Controller Area Network) and, thus it is possible to properly read a rotation speed of the engine Ne and a fuel supply amount "q". The rotation speed of the engine Ne and the fuel supply amount "q" can be detected by using a known sensor. The control unit 30 adequately controls an electric heater 44 provided in the supply pipe 26 on the basis of the pressure pu of the urea aqueous solution, temperature Tu of the urea aqueous solution, the rotation speed of the engine Ne, fuel supply amount q, and intake air temperature Ti in accordance with a control program stored in a ROM (Read Only Memory), thereby realizing promotion of defrosting and prevention of freezing of the urea aqueous solution at midwinter.

The engine control unit or a known sensor 42 for detecting the rotation speed of the engine Ne and the fuel supply amount q corresponds to an operating state detecting device. On the other hand, an atmospheric temperature estimating apparatus is embodied by the control unit 30 for executing the control program.

Figure 2:
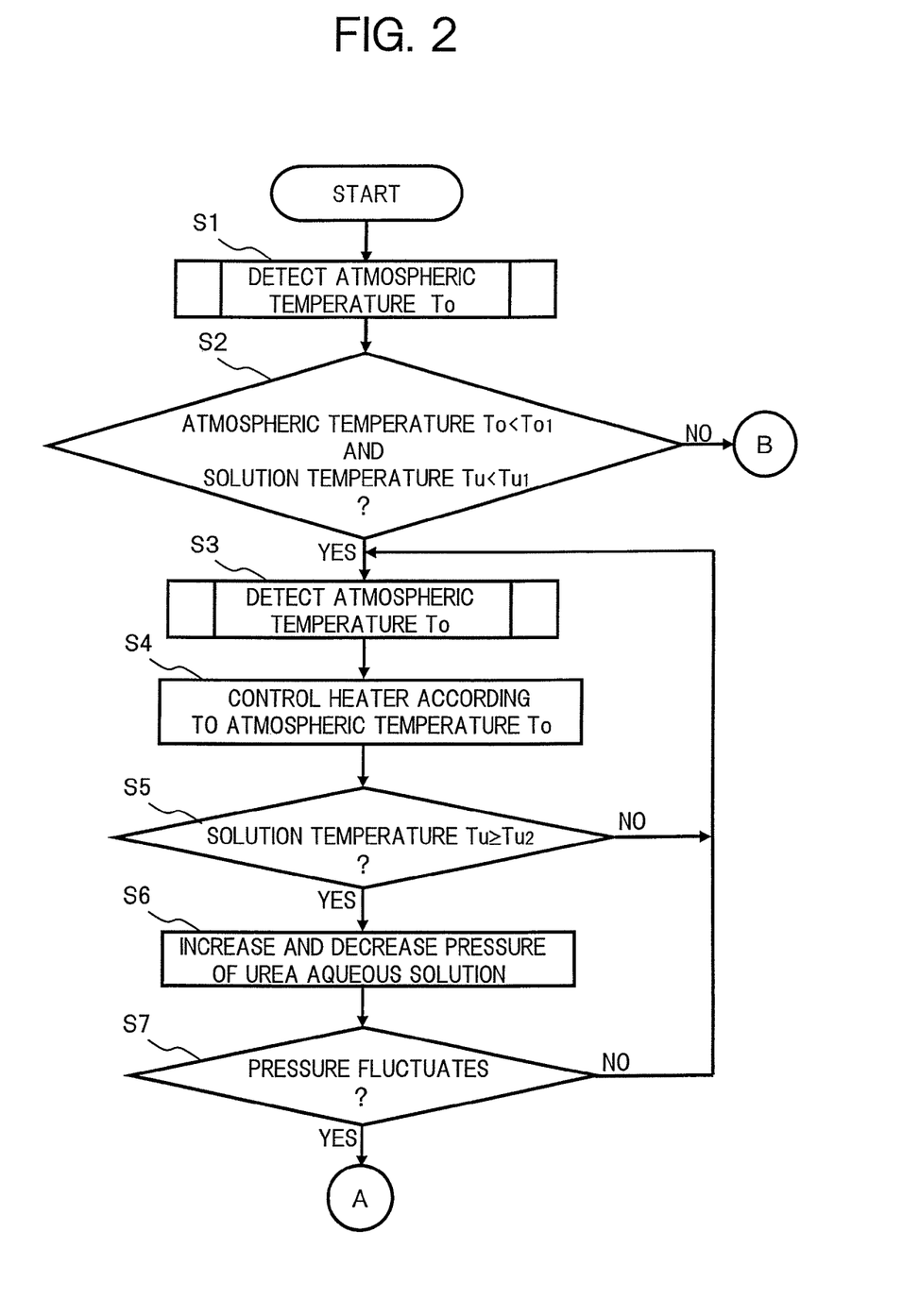
FIG. 2 is a flowchart illustrating a main routine of controlling an electric heater.
Figure 3:
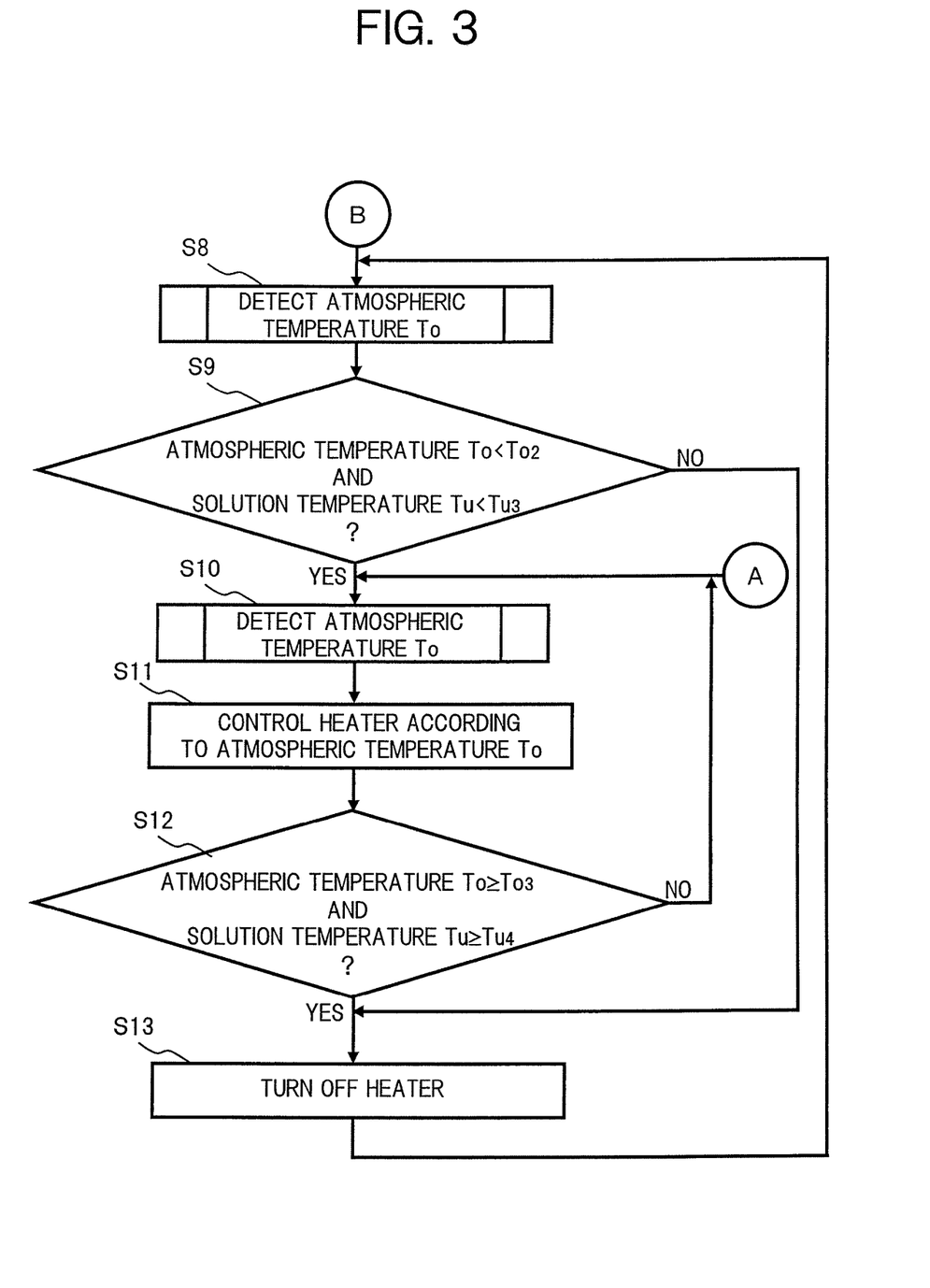
FIG. 3 is a flowchart illustrating the main routine of controlling the electric heater.

FIGS. 2 and 3 show the details of the control program executed on completion of warm-up after the engine 10 starts, in the control unit 30.

In step 1 (shown as "S1" in the diagram, and the other steps are shown similarly), a subroutine for detecting the atmospheric temperature To in accordance with the intake air temperature Ti is called. The details of the subroutine for detecting the atmospheric temperature To will be described later (similarly, the other subroutine will be described later).

In step 2, it is determined whether or not the atmospheric temperature To is lower than a predetermined value To, and the urea aqueous solution temperature Tu is lower than a predetermined value $Tu_1$. The predetermined values $To_1$ and $Tu_1$ are thresholds for determining whether or not there is the possibility that the urea aqueous solution is frozen, and are set according to the characteristics of the urea aqueous solution, and the like. When the atmospheric temperature To is lower than the predetermined value $To_1$ and the urea aqueous solution temperature Tu is lower than the predetermined value $Tu_1$, the control process proceeds to step 3 (Yes) to enter a defrosting mode. In the other cases, the control process proceeds to step 8 (No).

In step 3, a subroutine for detecting the atmospheric temperature To in accordance with the intake air temperature Ti is called.

Figure 4:
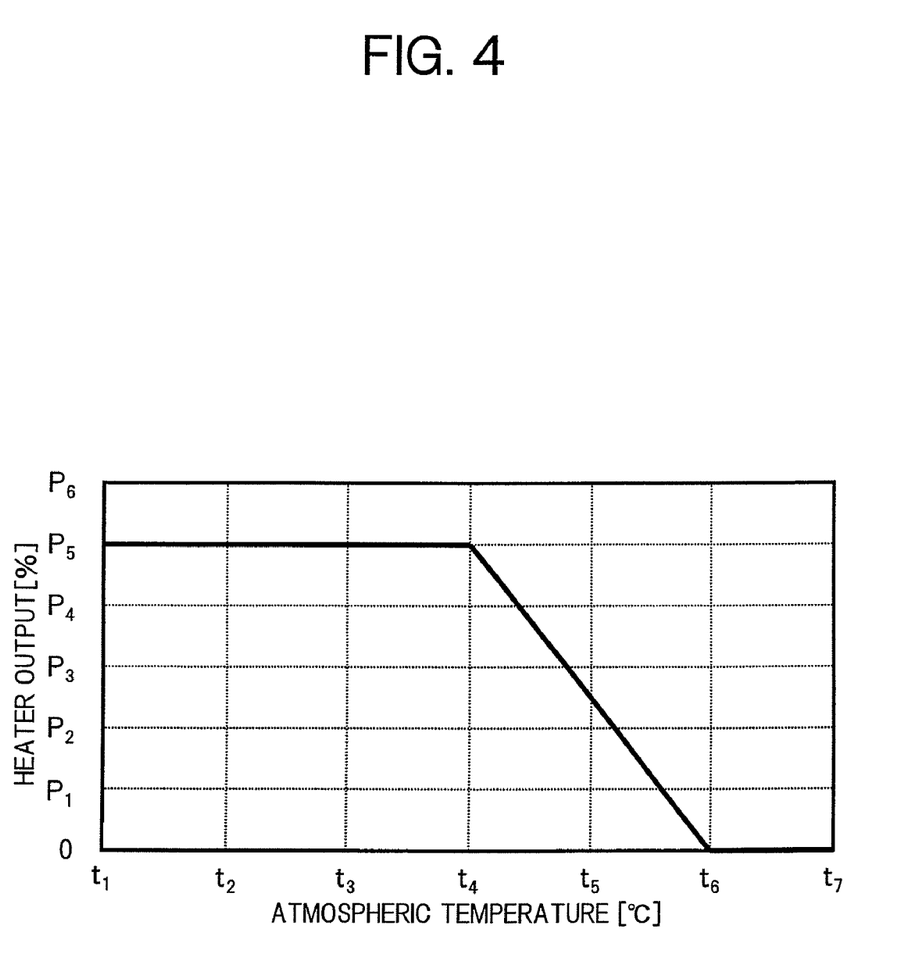
FIG. 4 is a diagram for explaining characteristics of controlling an output of the electric heater.

In step 4, the electric heater 44 is controlled with a heater output in response to the atmospheric temperature To with reference to a control map realizing the electric heater control characteristic shown in FIG. 4. Since the control characteristic is linearly expressed, when a control value in response to the atmospheric temperature To is not set in the control map, it is sufficient to interpolate the control value by known interpolation technique.

In step 5, it is determined whether or not the urea aqueous solution temperature Tu is equal to or higher than a predetermined value $Tu_2$. The predetermined value $Tu_2$ is a threshold for determining whether or not defrosting of the urea aqueous solution has been completed, and is set to a temperature slightly higher than a freezing point (freezing temperature) of the urea aqueous solution. When the urea aqueous solution temperature Tu is equal to or higher than the predetermined value $Tu_2$, the control process proceeds to step 6 (Yes). When the urea aqueous solution temperature Tu is less than the predetermined value $Tu_2$, the process returns to step 3 (No).

In step 6, a pump incorporated in the reducing agent supplying apparatus 28 is controlled to increase or decrease the pressure of the urea aqueous solution to be supplied to the injection nozzle 18.

In step 7, it is determined whether or not pressure fluctuation occurs in the urea aqueous solution pressure pu. When there is pressure fluctuation in the urea aqueous solution pressure pu, it is determined that defrosting of the urea aqueous solution has been completed, and the control process proceeds to step 10 (Yes). On the other hand, when there is no pressure fluctuation in the urea aqueous solution pressure pu, it is determined that defrosting of the urea aqueous solution has not been completed, and the process returns to step 3 (No).

In step 8, a subroutine for detecting the atmospheric temperature To in accordance with the intake air temperature Ti is called.

In step 9, it is determined whether or not the atmospheric temperature To is lower than a predetermined value $To_2$ and the urea aqueous solution temperature Tu is lower than a predetermined value $Tu_3$. The predetermined values $To_2$ and $Tu_3$ are thresholds to determine whether or not there is the possibility that the urea aqueous solution is frozen due to travel winds or the like although the urea aqueous solution is not frozen at present. Each of the predetermined values $To_2$ and $Tu_3$ is selectively set according to the characteristics of the urea aqueous solution and the like. When the atmospheric temperature To is lower than the predetermined value $To_2$ and the urea aqueous solution temperature Tu is lower than the predetermined value $Tu_3$, the control process proceeds to step 10 (Yes) to enter a heat retaining mode. In the other cases, the process proceeds to step 13 (No).

In step 10, a subroutine for detecting the atmospheric temperature To in accordance with the intake air temperature Ti is called.

In step 11, the electric heater 44 is controlled with a heater output in response to the atmospheric temperature To by a process similar to that of step 4.

In step 12, it is determined whether or not the atmospheric temperature To is equal to or higher than a predetermined value $To_3$ and the urea aqueous solution temperature Tu is equal to or higher than a predetermined value $Tu_4$. The predetermined values $To_3$ and $Tu_4$ are thresholds to determine whether or not there is the possibility that the urea aqueous solution is frozen by travel winds or the like. Each of the predetermined values $To_3$ and $Tu_4$ is set according to the characteristics of the urea aqueous solution and the like.

When the atmospheric temperature To is equal to or higher than the predetermined value $To_3$ and the urea aqueous solution temperature Tu is equal to or higher than the predetermined value $Tu_4$, the process proceeds to step 13 (Yes). In the other cases, the process returns to step 10 (No).

In step 13, since there is no possibility that the urea aqueous solution is frozen, the electric heater 44 is turned off to prevent waste power consumption.

Figure 5:
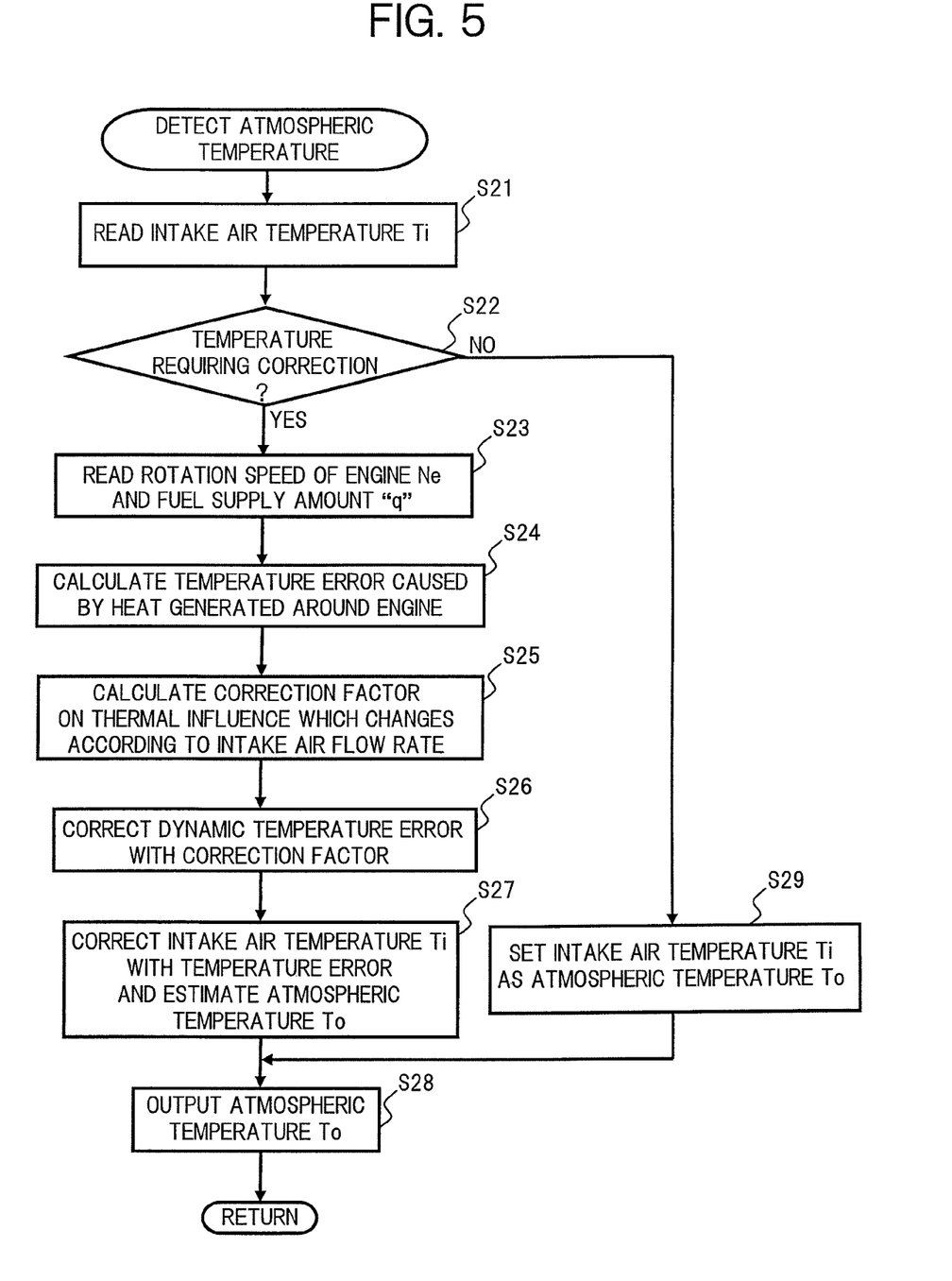
FIG. 5 is a flowchart illustrating a sub-routine for indirectly detecting atmospheric temperature in accordance with intake air temperature.

FIG. 5 shows the controls in a sub-routine for detecting the atmospheric temperature To. By executing the sub-routine, the atmospheric temperature detecting apparatus according to the present invention is embodied.

In step 21, the intake air temperature Ti is read from the airflow sensor 38.

In step 22, in order to prevent execution of improper control by the atmospheric temperature To excessively corrected, it is determined whether or not the intake air temperature Ti lies in a temperature range in which the intake air temperature Ti has to be corrected. That is, in order to control the electric heater 44 at high precision, it is sufficient to correct the intake air temperature Ti only in a predetermined range around the freezing point of the urea aqueous solution. Consequently, by executing no estimation of the atmospheric temperature in a range out of the predetermined range, for example, the atmospheric temperature To excessively corrected can be prevented from being used as a control variable. When it is necessary to correct the intake air temperature Ti, the control process proceeds to step 23 (Yes). On the other hand, when no correction is necessary, the control process proceeds to step 29 (No), and the intake air temperature Ti is set as the atmospheric temperature To.

In step 23, as an engine operating state realizing high-response control, the rotation speed of the engine Ne and the fuel supply amount "q" are read from the engine control unit 42.

In step 24, on the basis of the rotation speed of the engine Ne and the fuel supply amount "q", a dynamic temperature error caused by heat generated around the engine is estimated. To be concrete, a steady temperature error and a smoothed time constant of the temperature change are calculated on the basis of the rotation speed of the engine Ne and the fuel supply amount "q". By correcting the steady temperature error with the smoothed time constant, a dynamic temperature error is estimated. The steady temperature error can be obtained by referring to a map in which experimental values measured for some time are set. The smoothed time constant of the temperature change can be obtained by referring to a map in which a control value to which a known smoothing technique is applied is set. Consequently, a dynamic temperature error can be easily calculated in accordance with the engine operating state, and increase in the calculation load and the like can be suppressed.

In step 25, a correction factor in regard to the thermal influence which changes in response to the intake air flow rate is calculated on the basis of the rotation speed of the engine Ne and the fuel supply amount "q". Namely, when the intake air flow rate is high, the mass flow is high, so that the influence of the amount of heat generated around the engine becomes small. On the other hand, when the intake air flow rate is low, the mass flow is low, so that the influence of the amount of heat generated around the engine becomes large. Consequently, a correction factor according to the rotation speed of the engine Ne and the fuel supply amount "q" is introduced to improve the final control accuracy. Since there is a response delay from a change in the engine operating state, it is desirable to calculate the intake air flow rate from the rotation speed of the engine Ne and the fuel supply amount "q".

In step 26, the dynamic temperature error is corrected with the correction factor.

In step 27, the intake air temperature Ti is corrected with the dynamic temperature error, so that the atmospheric temperature To is estimated.

In step 28, the atmospheric temperature To is output as a return value.

In the exhaust emission purification apparatus, when there is the possibility that the urea aqueous solution is frozen on completion of warm-up, the electric heater 44 operates with a heater output according to the atmospheric temperature To, so that the urea aqueous solution in the supply pipe 26 is defrosted. When defrosting of the urea aqueous solution is completed or there is the possibility that the urea aqueous solution freezes due to travel wind or the like, the electric heater 44 operates with the heater output in response to the atmospheric temperature To, so that the temperature of the urea aqueous solution in the reducing agent container 24 is kept within the predetermined temperature range (higher than $Tu_3$ and equal to or lower than $Tu_4$). On the other hand, when the urea aqueous solution is not frozen and there is no possibility of freezing by the travel wind or the like, the operation of the electric heater 44 is stopped to prevent waste power consumption.

Therefore, without causing various inconveniences such that either the electric heater 44 is left being operated in spite of non-occurrence of freezing of the urea aqueous solution or the electric heater 44 is not brought into operation in spite of occurrence of freezing of the urea aqueous solution, it is able to achieve appropriate preventing of the urea aqueous solution from freezing and promotion of defrosting of the urea aqueous solution.

At this time, the atmospheric temperature To is estimated by correcting the intake air temperature Ti detected by the airflow sensor 38 on the basis of the rotation speed of the engine Ne and the fuel supply amount "q" as the engine operating state. Concretely, the dynamic temperature error caused by the heat generated around the engine and the correction factor in regard to the thermal influence which changes according to the intake air flow rate are calculated on the basis of the engine operating state. After the dynamic temperature error is corrected with the correction factor, the intake air temperature Ti is corrected with the temperature error, thereby estimating the atmospheric temperature To. Consequently, the difference between the estimated atmospheric temperature To and the actual atmospheric temperature is small, and the accuracy in the detection of the atmospheric temperature To can be sufficiently high. Only by slightly changing how to control, the apparatus for directly detecting the atmospheric temperature To is unnecessary. Thus, increase in the cost caused by providing the apparatus can be suppressed.

The present invention is not limited to the configuration in which the electric heater 44 is attached to the supply pipe 26, but may employ another configuration in which the electric heater 44 is attached to at least a part of the urea aqueous solution supply system, that is, at least one of the reducing agent container 24 and a pipe (including the supply pipe 26) communicating with the reducing agent container 24 and the injection nozzle 18. In such a configuration, a part which is exposed to the atmospheric air and is easily frozen can be intensively heated or kept warm. Therefore, promotion of defrosting and prevention of freezing of the urea aqueous solution can be realized effectively. The present invention is not limited to the configuration in which the atmospheric temperature To and the urea aqueous solution temperature Tu are used as control variables in order to control the operation of the electric heater 44. Only the atmospheric temperature To may be used as a control variable.

Further, in the case of using the atmospheric temperature detecting apparatus by itself, the processes in the steps 22 and 29 in FIG. 5 are unnecessary.

Although the urea aqueous solution is used as a precursor of a reducing agent in the embodiment, an ammonia solution as the reducing agent, and diesel oil, petroleum, gasoline, or the like consisting mainly of hydrocarbon as a precursor of the reducing agent may be properly and selectively used according to the characteristic of the NOx reduction catalytic converter 20.

I claim:

1. An atmospheric temperature detecting apparatus comprising:
    a hot wire airflow sensor capable of detecting a flow rate of an intake air and an intake air temperature;
    an operating state detecting device that detects configured to detect an engine operating state; and
    an atmospheric temperature estimating device configured to estimate an atmospheric temperature by correcting the intake air temperature detected by the airflow sensor in accordance with the engine operating state detected by the operating state detecting device,
    wherein the atmospheric temperature estimating device is configured to calculate a dynamic temperature error caused by heat generated around an engine in accordance with the engine operating state to thereby correct the intake air temperature detected by the airflow sensor with the dynamic temperature error, to thereby estimate the atmospheric temperature.

2. The atmospheric temperature detecting apparatus according to claim 1, wherein the atmospheric temperature estimating device is configured to calculate a correction factor in regard to thermal influence which changes according to the flow rate of the intake air in accordance with the engine operating state to thereby correct the dynamic temperature error with the correction factor and further correct the intake air temperature detected by the airflow sensor with the corrected dynamic temperature error, to thereby estimate the atmospheric temperature.

3. The atmospheric temperature detecting apparatus according to claim 2, wherein the atmospheric temperature estimating device is configured to calculate a stationary temperature error and a smoothed time constant of the temperature change in accordance with the engine operating state to correct the stationary temperature error with the smoothed time constant to thereby calculate the dynamic temperature error.

4. The atmospheric temperature detecting apparatus according to claim 1, wherein the operating state detecting device is configured to detect a rotation speed of the engine and a fuel supply amount as the engine operating state.

5. An exhaust emission purification apparatus for purifying exhaust emission from an engine by injection-supplying, from an injection nozzle, a reducing agent or its precursor according to an engine operating state to an exhaust emission on an upstream side of a reduction catalytic converter disposed in an engine exhaust system, and reducing a nitrogen oxide in exhaust emission by the reduction catalytic converter due to the catalyst reduction reaction employing the reducing agent, wherein the apparatus comprises:
    an electric heater provided on at least a part of a supply system capable of supplying the reducing agent or its precursor;

a hot wire airflow sensor capable of detecting a flow rate of an intake air and an intake air temperature; and a control unit having incorporated therein a computer, wherein the control unit is configured to calculate a dynamic temperature error caused by heat generated around an engine in accordance with the engine operating state to thereby correct the intake air temperature detected by the airflow sensor with the dynamic temperature error, to thereby estimate an atmospheric temperature, and to control the electric heater in response to the estimated atmospheric temperature.

6. The exhaust emission purification apparatus according to claim 5, wherein the control unit is further configured to calculate a correction factor in regard to thermal influence which changes according to the flow rate of the intake air on the basis of the engine operating state to thereby correct the dynamic temperature error with the correction factor, and to further correct the intake air temperature detected by the airflow sensor with the corrected dynamic temperature error to thereby eventually estimate the atmospheric temperature.

7. The exhaust emission purification apparatus according to claim 6, wherein the control unit is further configured to calculate a stationary temperature error and a smoothed time constant of the temperature change in accordance with the engine operating state to thereby calculate the dynamic temperature error by correcting the stationary temperature error with the smoothed time constant.

8. The exhaust emission purification apparatus according to claim 5, wherein the control unit is configured to estimate the atmospheric temperature when the intake air temperature detected by the airflow sensor is in a predetermined range.

9. The exhaust emission purification apparatus according to claim 5, wherein the electric heater is provided on at least one of a reducing agent container for storing the reducing agent or its precursor and a pipe which is arranged for providing a fluid communication between the reducing agent container and the injection nozzle.

* * * * *

UNITED STATES PATENT AND TRADEMARK OFFICE
CERTIFICATE OF CORRECTION

PATENT NO. : 7,810,320 B2  
APPLICATION NO. : 12/173791  
DATED : October 12, 2010  
INVENTOR(S) : Hideki Matsunaga Page 1 of 1

It is certified that error appears in the above-identified patent and that said Letters Patent is hereby corrected as shown below:

IN THE SPECIFICATION:

In Column 4, Line 53: Replace "To", with --$To_1$--.

IN THE CLAIMS:

In Column 8, Line 19: Remove "that detects".

Signed and Sealed this
Thirtieth Day of August, 2011

David J. Kappos
*Director of the United States Patent and Trademark Office*